United States Patent Office 2,919,834
Patented Jan. 5, 1960

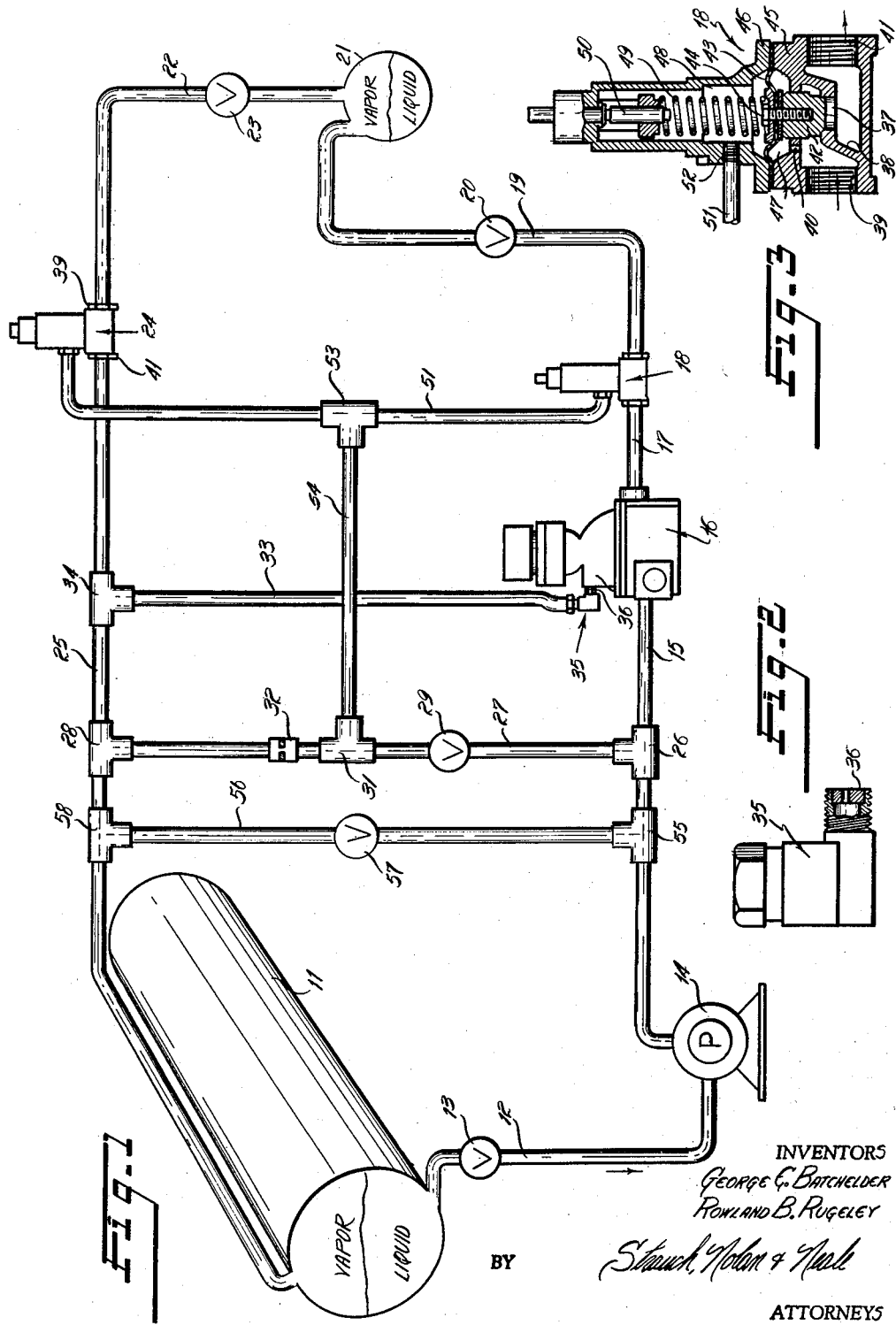

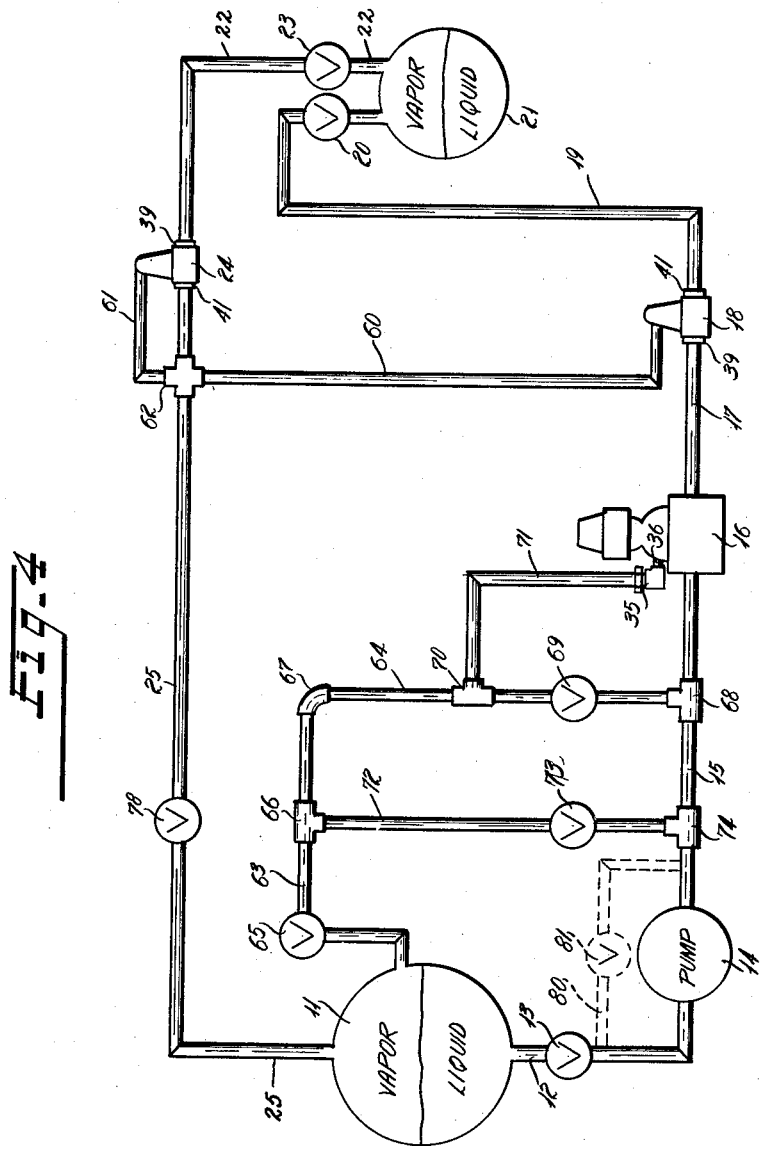

2,919,834

DISPENSING SYSTEM FOR HIGHLY VOLATILE LIQUIDS

Rowland B. Rugeley, Houston, Tex., and George E. Batchelder, Pittsburgh, Pa., assignors to Rockwell Manufacturing Company, Pittsburgh, Pa., a corporation of Pennsylvania Application June 12, 1956, Serial No. 590,974

18 Claims. (Cl. 222—52)

This invention relates to a novel system for dispensing highly volatile liquids such as anhydrous ammonia and liquified petroleum gases like propane and butane and is particularly directed to novel arrangements including a vapor return line connected between the receiver and the storage tank, wherein return to storage of the dispensed liquid in the form of vapor is reduced to a minimum and accurately metered dispensing to a selected receiver is attained.

The optimum metered dispensing of a high vapor pressure liquid, for example the filling of a receiver such as a tank truck from a large storage reservoir, or the discharge of the liquid from a tank truck reservoir to the receiver vessel at the point of use of the liquid, requires essentially that the liquid being supplied to the receiver must be contained with at least enough back pressure that it will be maintained in liquid state in order to obtain accurate measurement, because the usual positive displacement meters used in flow measurement will respond to some extent to passage of a volume of vapor as well as liquid and thereby so vary the meter reading as to render it unreliable as a measure of the true quantity of liquid dispensed. It has been for some time common practice to control the back pressure in such a system to keep it from becoming excessive under normal conditions by employing a differential pressure regulator in the dispensing conduit which automatically varies the back pressure with changes in the vapor pressure above the liquid in the storage reservoir due to temperature and like conditions and such a system is shown in United States Letters Patent No. 2,049,239 issued July 28, 1936 to Francis W. Wilcox. In that patent, the combined forces of the high vapor pressure above the liquid in the reservoir plus a preloaded spring are balanced in a differential pressure valve against the outlet pump pressure exerted on the dispensed liquid to regulate pressure in the conduit between the pump and the valve in which conduit the meter is contained, so that the back pressure against the pump and meter always exceeds by a fixed amount the existing vapor pressure and therefore there can be no vaporization of the liquid in the pump discharge conduit between the pump and differential valve.

This control system, while insuring that no vaporization takes place in the pump discharge line or in the meter itself, does not prevent vaporization of these highly volatile liquids on entering or after the liquids enter the receiver. Generally, in the dispensing of such liquids, either from a storage tank to a tank truck or from the tank truck to a storage tank, the receiver contains some initial amount of liquid before the dispensing operation begins. If these receivers are closed containers, the liquid and the space above the liquid within the receiver is under pressure equal to the vapor pressure of the liquid corresponding to the temperature of the fluid in the receiver.

If it were possible to maintain the temperature within the receiver constant, it would be possible to pump liquid into the receiver without any increase in the pressure in the receiver since under constant temperature conditions, as the liquid level was raised, tending to increase the pressure within the receiver, a sufficient amount of vapor above the liquid would condense into liquid to allow the pressure within the closed receiver to remain constant as the liquid level rises. Thus, under constant temperature conditions, it would be possible to completely fill the receiver with liquid with a pump having an output pressure slightly greater than the vapor pressure within the receiver corresponding to the temperature of the receiver. However, the pump does work on the liquid in order to cause it to flow into the receiver against the vapor pressure of the fluid in the receiver, which work causes an increase in the temperature of the liquid entering the receiver and consequently an increase in the temperature in the receiver itself. This increase of temperature within the receiver causes an increase in the vapor pressure in the closed receiver which in turn necessitates the performance of a greater amount of work on the liquid to cause it to enter the receiver, thus causing a further increase in temperature of the incoming fluid. Thus, it can be seen that to completely fill the closed receiver with liquid, a pump with a prohibitively high output pressure must be used.

To reduce the pressure ratings required of pumps used in these dispensing systems, it has been the practice to provide a return line extending from the vapor space within the receiver to the supply reservoir. While this return line will prevent the build-up of unduly large pressures and temperatures within the receiver, it also permits the return of vapor back to the supplier and consequent loss to the customer of fluid which had already been paid for by the customer.

The present invention is concerned with solving the problem of preventing such waste or customer loss in the form of vapor or gas at the receiver under conditions most frequently encountered in the field. It specifically involves the provision of a second differential pressure control valve in a vapor return line between the receiver and the dispensing or storage reservoir so connected into the system that in effect, once the fill cycle starts, the controlling back pressure in the system is transferred to a point in the vapor return line and the pressure in the receiver is maintained somewhat above the vapor pressure of the dispensed liquid.

It is therefore the major object of the present invention to provide a novel system for dispensing highly volatile liquids into a reservoir wherein wasteful flashing of the liquid into gas or vapor at the reservoir is prevented by suitable pressure control.

A further object is to provide a novel system for dispensing a highly volatile liquid into a receiver wherein a vapor return line is provided between the receiver and the dispensing tank and associated differential pressure responsive valves in the dispensing conduit and the vapor return line are provided to control the back pressure effective on the liquid in the system.

Further objects of the invention will appear as the description proceeds in connection with the appended claims and the annexed drawings wherein:

Figure 1 is a mainly diagrammatic view of the system of the invention according to a preferred embodiment;

Figure 2 is an enlargement partially cut away and in section of a meter by-pass fitting;

Figure 3 is an enlarged section showing the structure of each differential pressure responsive valve; and Figure 4 is a modification of the system shown in Figure 1.

Referring particularly to the system shown in Figure 1 a storage tank or reservoir 11 contains, for example, liquified butane, propane or anhydrous ammonia under suitable pressure, and a delivery conduit 12 having a manual shut-off valve 13 leads to the intake of a pump which is preferably located below the reservoir 11. Pump 14 forces the liquid in succession through conduit 15, a flow meter 16 which may be of any suitable design, conduit 17, pressure control valve 18 and conduit 19 to a suitable receiver 21 through a manual valve 20 which may be a dispensing nozzle.

A vapor return conduit 22 containing a manually operated valve 23 extends from the receiver 21 to a pressure control valve 24 which is similar to that at 18 and is connected by a conduit 25 to the upper vapor space of reservoir 11.

Conduit 15 contains a T-fitting 26, the leg of which is connected by conduit 27 to the leg of a T-fitting 28 in conduit 25. A manual control valve 29 is provided in conduit 27 between fitting 26 and a T-fitting 31 in conduit 27, and a flow restricting orifice 32 is provided in conduit 27 between T-fittings 31 and 28.

A conduit 33 extends between the leg of a T-fitting 34 that is located in conduit 25 between valve 24 and fitting 28 and an elbow 35 which is coupled into the top of the meter just ahead of or immediately upstream from the measuring chamber in the interior of the meter 16. Elbow 35, as shown in Figure 2, contains a flow restrictive orifice plate 36, the purpose of which will become apparent. Functionally, however, conduit 33 with its orifice 36 could also extend directly between conduits 25 and 15 on the pump side of the meter 16, but it is usually preferable to make the connection at the top side of the meter housing where vapors may collect and be vented into conduit 33 so as to bleed off vapors from a point as close as possible immediately upstream of the measuring chamber of the meter 16.

Valves 18 and 24 are preferably exactly alike physically although their inlets and outlets are reversed in use and their structure is shown in Figure 3. A valve seat opening 37 is provided on an internal wall 38 between inlet 39 and outlet 41. A valve element 42 adapted to close opening 37 is secured to the center of a flexible diaphragm 43 as by screw 44 and the periphery of diaphragm 43 is clamped between the casing parts 45 and 46. The diaphragm provides a chamber 47 exposed to inlet line pressure through opening 40 and a chamber 48 that contains a biasing compression spring 49 urging valve element 42 to seat on and close opening 37. The compression of spring 49 is controlled by adjustment 50.

A conduit 51 connects the side openings 52 of chambers 48 of both valves 18 and 24 in fluid communication, and a T-fitting 53 is disposed in conduit 51 with its leg connected by a conduit 54 to the leg of T-fitting 31 in conduit 27. In this system, as described, the conduit 22 is connected to inlet 39 of valve 24 and the vapor pressure from the receiver as will appear is applied to chamber 47 of valve 24, and the conduit 25 is coupled to outlet 41 of the valve 24.

A pump by-pass conduit may be provided between the conduits 15 and 25 by means of T-fitting 55, conduit 56, valve 57 and T-fitting 58, the purpose of which is to partially or wholly return the output of the pump back to the reservoir under certain conditions of pressure and temperature in the system and to thereby prevent overloading of the pump under such conditions. The valve 57 may be of the spring biased check type which opens only when a certain pressure in conduit 56 is exceeded or may be of the manually operated type. In the case where a spring biased check valve is used the output pressure of the pump 14 can never exceed the setting of the valve 57 since any increase in the pressure in the system will cause the valve 57 to open thus by-passing the output of the pump or enough of it back to the reservoir 11 via the conduits 56 and 25 to maintain the pressure in the system, and therefore the pressure against which the pump must work, below the setting of the valve 57.

When a manual type valve is used for valve 57 it operates in a similar manner except that the manual valve is set for a certain opening and therefore continuously by-passes a certain amount of the pump output back to the reservoir while the system is in operation. In this case the valve is manually set to by-pass enough fluid under the prevailing pressure and temperature conditions in the system to maintain the pump output at the desired pressure.

In the modified system shown in Figure 4 the reservoir 11, conduit 12, valve 13, pump 14, conduit 15, meter 16, conduit 17, conduit 19, valve 20, receiver 21, conduit 22, valve 23, conduit 25 and the inlets and outlets of pressure control valves 18 and 24 are connected in a manner identical to that shown in the system shown in Figure 1. In modification shown in Figure 4, however, the chambers 48 of both valves 18 and 24 are connected by means of conduits 60 and 61 respectively to a junction fitting 62 in line 25. A second return conduit 63 containing a manual valve 65 and a T-fitting 66 is connected by means of elbow 67 to one end of conduit 64, the other end of which is connected to conduit 15 by means of T-fitting 68 at a point upstream of meter 16. A manual valve 69 and T-fitting 70 are included in conduit 64. Conduit 71 extends between one leg of T-fitting 70 and elbow 35 containing orifice 36 to thereby connect the top of the interior of meter 16 to the return conduit 63. By-pass conduit 72 contains a valve 73 and extends between T-fitting 66 in conduit 63 and T-fitting 74 in conduit 15. As in the case of valve 57 in the system of Figure 1, the valve 73 may be of the spring biased check type or of the manually operated type. A manual valve 78 may be provided in return conduit 25 to provide a shut off control in the vapor return conduit at a point close to the reservoir. As will be explained hereinafter it may be desirable under certain conditions to provide a pump by-pass line 80 and valve 81 indicated in dotted lines in Figure 4.

In practice, of course, the actual piping or conduit arrangements may be combined or differently arranged physically, but Figures 1 and 4 show the arrangement diagrammatically.

*Operation*

Referring to the system shown in Figure 1, before being put into operation, the control valve 29 is open so that initially, the chambers 48 in valves 18 and 24 are connected to the outlet of pump 14 through conduits 27, 54 and 51. Valve 13 is opened and pump 14 is then started. Because of the restriction in the conduits 27 and 33 and the obstruction to the flow of liquid therethrough presented by orifice 32 and 36 respectively, substantially the full outlet pressure of the pump 14 is applied to chamber 48 of valves 18 and 24. At the same time, the full outlet pressure of the pump 14 is applied to conduit 15, meter 16, conduit 17 and to chamber 47 of valve 18. Thus, initially, the output pressure of the pump 14 is simultaneously applied to both sides of the diaphragm 43 of valve 18 but because of spring 49, valve 18 is held in a closed position.

This insures that the conduit 15, meter 16 and conduit 17 will contain only liquid. Also, any vapors which tend to collect in this part of the system will be bled off and returned to the storage tank 11 via conduits 25, 27 and 33. However, the flow of liquid in conduits 27 and 33 is prevented by the orifices 32 and 36 respectively, these orifices being of such a size that any fluid flow therethrough would create such a pressure drop across the orifices that the volatile fluids dispensed in this system would immediately flash into vapor and be returned to reservoir 11. Thus, orifices 32 and 36 are of such a small size as to maintain substantially full pump pressure in conduit 15, meter 16 and conduit 17, yet large enough to allow passage of vapors back to the reservoir 11.

To put the system of Figure 1 into operation, the valves 20 and 23 are first opened and the valve 29 is slowly closed. When valve 29 is completely closed, the outlet pressure of pump 14 is removed from chamber 48 of valves 18 and 24. Because the fluid in the system made up of the vapor space in reservoir 11, conduits 25, 54 and 51 is relatively static, the chambers 48 in valves 18 and 24 will now be subjected to the vapor pressure of the vapor in this part of the system. Thus, valve 18 will not open unless its chamber 47 is subjected to a pump outlet pressure at least as great as the vapor pressure of the fluid in reservoir 11 plus the pressure of spring 49. Since any pressure greater than the vapor pressure of the fluid will cause the fluid to condense, no fluid flow can take place in the conduit 15, meter 16 and conduit 17 unless the pressure in these conduits is greater than the vapor pressure of the fluid, which insures that the fluid in this system is liquid before any flow through the meter can take place.

As soon as valve 29 is completely closed, fluid in a liquid state begins to flow through conduit 15, meter 16, conduit 17, valve 18, conduit 19 and into receiver 21.

If the temperature in the receiver 21 is equal to or less than the temperature of reservoir 11, the vapor pressure of the fluid initially in receiver 21 will be equal to or less than the vapor pressure in reservoir 11. Since chamber 48 of valve 24 is subjected to the vapor pressure of the fluid in reservoir 11, and chamber 47 of valve 24 is subjected to the vapor pressure of the fluid in receiver 21, valve 24 will remain closed until the pressure in receiver 21 becomes greater than the pressure in chamber 48 plus the pressure of spring 49. Thus, valve 24 will be effective to block the passage of fluid through lines 22 and 25 back to reservoir 11, so long as the temperature and pressure in the receiver 21 is less than or equal to the temperature and vapor pressure of the fluid in reservoir 11. As long as the temperature in receiver 21 is equal to or less than the temperature in reservoir 11, the valve 24 will remain closed.

As fluid in the liquid state is pumped into the receiver 21, the liquid level therein begins to rise which causes a slight momentary rise in pressure in the receiver 21. This rise in pressure causes the vapor above the liquid in the receiver to condense into liquid, thereby reducing the pressure in the receiver to the vapor pressure of the fluid contained therein. This process of condensation continues as liquid is pumped into the receiver, and so long as the temperature in receiver 21 remains equal to or less than that of reservoir 11, the pump 14 will continue to pump liquid into the receiver 21 and the liquid level therein will continue to rise without any appreciable increase of pressure therein over the vapor pressure of the fluid contained in the receiver 21. However, since it is necessary to do work on the fluid to pump it into the receiver, the fluid entering the receiver 21 tends to be of greater temperature than that in reservoir 11. Therefore, as more and more liquid enters into the receiver 21, the temperature and pressure therein tend to increase. However, the liquid level will continue to rise until the temperature in receiver 21 is appreciably greater than the temperature in reservoir 11 since the vapor pressure in the receiver must overcome the vapor pressure of the reservoir plus the pressure of spring 49 in valve 24 before the valve 24 opens. Only when this pressure is exceeded does the valve 24 open and allow some of the vapor in the receiver to escape and return to the reservoir 11. Therefore, the pump continues to pump liquid into the receiver 21 against a pressure which can only reach a value equal to the vapor pressure in the reservoir 11 plus the pressure of spring 49 in valve 24. Thus the valve 24 acts as a relief valve so that when the pressure in the receiver 21 becomes great enough to cause it to open, its opening will cause an immediate reduction of pressure in the receiver with a consequent cooling of vapor in the receiver and a further reduction of pressure. Therefore, the differential valve 24 will quickly close again having passed only a negligible amount of vapor.

When the temperature of the receiver 21 is initially greater than that of reservoir 11 which might occur, for instance, when the reservoir 11 is an underground storage tank and the receiver 21 is the tank of a tank truck, the vapor pressure in the receiver is naturally greater than the vapor pressure in the reservoir 11. Usually in these cases, the spring 49 provides sufficient pressure against the top of diaphragm 43 so as to overcome the differential between the vapor pressure in receiver 21 and that in reservoir 11 so as to keep the valve 24 closed. In such cases, the incoming liquid will have less of an effect in raising the temperature of the fluid in receiver 21 and as liquid continues to flow into the receiver, more and more of the vapor will condense to allow the liquid level to rise without any substantial increase of pressure above the vapor pressure of the fluid in the receiver. Only infrequently will the temperature in the receiver become high enough to cause the vapor pressure to open valve 24, allowing the return of vapors to the reservoir.

The operation of the system may be summarized as follows:

In order to initiate the flow of fluid into the receiver, the control valve 29 is slowly closed, thereby removing the pump pressure from the top sides of the diaphragms 43 of differential valves 18 and 24 and venting the diaphragms through orifice 32 back to the reservoir 11. Since the tops of these diaphragms are now subjected to vapor and spring pressure only, pump pressure of sufficient value is exerted on the under side of the diaphragm 43 in valve 18 to overcome the vapor and spring pressures on the top side, thereby opening the differential valve 18 and allowing fluid in a liquid state to flow into the receiver 21. Therefore, differential valve 18 is effective to maintain the pressure in the line between the pump 14 and the valve 18 at a pressure greater than the vapor pressure of the fluid, thereby maintaining the fluid in the liquid state.

When valve 18 opens, liquid will flow to the receiver and will result, as above explained, in condensation of the vapor therein at a rate to make room for a steady inflow of liquid. If variation of temperature conditions causes the vapor pressure in the receiver 21 to exceed that in reservoir 11 by the amount determined by the force of the spring setting of valve 24, the valve 24 will open automatically and relieve the excess pressure in the receiver 21. This will occur only intermittently and the total amount of vapor escaping from the receiver 21 will be much less than it would if the vapor return line was unrestricted or haphazardly controlled manually. As a matter of fact, if the receiver is properly designed and installed and if the liquid is pumped into the receiver at a proper rate to allow dissipation of the heat from the receiver at the same rate heat is added to the receiver by the incoming liquid, the temperature of the receiver will be maintained reasonably constant at a point where the vapor pressure of the liquid in the receiver is always below the vapor pressure in the reservoir plus the pressure of spring 49 in the valve 24 and the valve 24 will not open at any time during the entire filling operation.

Once the system is in operation, the control point by means of which sufficient back pressure is maintained on the meter 16 to keep the fluid flowing through it in a liquid state, is shifted from valve 18 to valve 24. Thus, after the filling operation has started, valve 18 becomes unnecessary. However, valve 18 is necessary in starting the system to initially keep the fluid in the conduits 15 and 17 and meter 16 in a liquid state when the system is first put into operation. Without valve 18 in the system, a considerable amount of fluid would have to be dispensed and pumped into receiver 21 before sufficient back pressure would be built up to insure that the fluid flowing through the meter was in a liquid state. This would result in false registration and overspeeding of the meter and possible meter damage. This condition would be particularly acute when the temperature of the receiver 21 is appreciably lower than that of reservoir 11. Therefore, valve 18 insures that the fluid flowing through the meter 16 when the filling operation is first initiated will be liquid. Thereafter, the function of valve 18 will be performed by valve 24.

If it is desired to close down the system and stop flow to the receiver, all that is necessary is to open valve 29 whereby pump pressure is applied to the chambers 48 of both valves 18 and 24 and results in closing them. Orifice 32 permits full pump pressure to be applied to chamber 47 and now cooperates with orifice 36 to prevent recirculation of liquid back to the reservoir when valve 29 is open. Also, the filling operation may be stopped in this system by simply closing valve 20 which positively cuts off the flow of any fluid into the receiver and it is one of the advantages of this system that its operation can be stopped from two different points in the system. However, when the filling operation is stopped in this manner, it is necessary that valve 29 be opened again before attempting to start a subsequent filling operation. It should be understood that the filling operation may also be stopped by closing either of the valves 13 or 20, but it is usually convenient to stop the operation by opening valve 29.

The system shown in Figure 4 functions in a manner similar to the system of Figure 1 except that the chambers 48 of valves 18 and 24 are never subjected to the pump output pressure but instead are directly connected to the vapor return line 25. Also the meter vent conduit 71, conduit 64 and bypass conduit 72 are directly connected to a second return conduit 63.

Assuming the system in initially completely shut down, to put the system into operation valves 13, 23, 65 and 78 are opened completely and valve 69 is cracked open slightly to insure that fluid completely floods the system from the reservoir to the meter 16 if it is of the positive displacement type or to the valve 18 if the meter is of the non-positive displacement type, these elements always being placed at a point below both the reservoir and receiver. If the pump 14 is of the positive displacement type it is necessary to insure flooding of the system to this extent by providing a by-pass conduit 80 around the pump. The valve 81 in conduit 80 is opened to allow fluid to flood the system and is then closed before the pump 14 is started. If the valve 73 is of the manual type, it is then opened to the extent necessary to recirculate enough of the fluid from the pump to maintain the pump output pressure at the desired point and the pump is then started and the valve 69 is closed. Thereafter the valve 73 will recirculate enough fluid from the pump back to the reservoir to maintain the pump output pressure constant for reasonably constant temperature conditions in the system. If a spring biased check valve is used for valve 73 it is merely necessary to start the pump after the system has become sufficiently flooded and the valve 73 will automatically open the proper amount to maintain the pump output pressure at the desired value. The valve 29 is then opened and the dispensing operation begins. Since the chamber 48 of valve 18 is connected to the return conduit 25 it will not pass fluid unless the pump output pressure is equal to or greater than the vapor pressure in the reservoir 11, plus the pressure of the spring 49, thus insuring that the fluid passing through valve 18 is liquid for all conditions when the vapor pressure in conduit 17 is equal to or less than the vapor pressure in reservoir 11 plus the pressure of the spring 49.

As the fluid flows into receiver 21 the valve 24 will maintain the pressure in receiver 21 at a value equal to or less than the vapor pressure in reservoir 11 plus the pressure of spring 49 in valve 24. Only when the pressure in receiver 21 is increased to a point where it exceeds the vapor pressure in reservoir 11 plus the pressure of spring 49 in valve 24, will valve 24 open to allow the passage of a small amount of vapor, which immediately reduces the pressure in the receiver 21 as was explained in connection with the system of Figure 1.

Since in the system shown in Figure 1, conduit 56 recirculates fluid from the pump which is largely in liquid form, this recirculation of liquid has the tendency during the dispensing operation to create a back pressure on the diaphragms of pressure control valves 18 and 24, particularly when a large amount of fluid is being recirculated. This of course may put an additional pressure on the diaphragms of valves 18 and 24 which would then require an unduly large pressure to open them. Under such conditions the flow of fluid would be interrupted or reduced. To avoid this condition in the system shown in Figure 4 the pump by-pass conduit 72 is connected to a separate return conduit 63 and the chambers 48 of valves 18 and 24 are connected directly to the vapor return conduit 25.

In the system of Figure 1 the valve 29 was initially open and due to the orifice 32, full pump output pressure was applied to the top of diaphragms 43 to positively hold the valves 18 and 24 closed until it was desired to start the dispensing operation. Since in the system of Figure 4 the output of the pump is not in any way connected to the chambers 49 of valves 18 and 24, it is not necessary to have an orifice in conduit 64, the valve 69 being used to provide a suitable restricted opening therein to permit flooding of the pump as explained above. The conduit 71 is effective to vent vapors accumulated in the top of the meter back to the receiver by means of conduits 64 and 63. Since the conduit 71 is effective mainly to vent vapors from the meter casing while the system is at rest and during the starting period of the dispensing operation, and since the pump output is applied directly to the meter 16, the recirculation of fluid in the conduits 72 and 63 will not have any effect on the operation of the system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a system for measurably dispensing a highly volatile liquid from a reservoir containing a quantity of such liquid to a receiver, the combination of a dispensing conduit means for connecting between the reservoir and receiver, said conduit means having therein in downstream succession a pump, a liquid meter and a first differential pressure valve with control means arranged and connected to at least initially provide and maintain a substantially constant pressure differential between the fluid in said conduit upstream of said valve and the vapor space above the liquid in said reservoir, a return conduit means for connecting between the receiver and reservoir, and a second differential pressure controlled valve means in said return line for maintaining the interior of said receiver above the vapor pressure of said liquid while the receiver is being filled with said liquid.

2. In the system defined in claim 1, said second differential pressure controlled valve means having control means responsive to the difference in pressure between the vapor spaces in said reservoir and said receiver.

3. In a system for accurately measurably dispensing a highly volatile liquid from a reservoir to a receiver, the combination of a dispensing conduit means for connecting between said reservoir and receiver and containing a liquid meter, return line means for connecting the interior of the receiver to said reservoir above the liquid level of both, and means in said return line, means responsive to vapor pressures in said reservoir and said receiver for maintaining a pressure within said receiver and on said meter exceeding the vapor pressure of the dispensed liquid entering said receiver.

4. In a system for dispensing a highly volatile liquid from a reservoir to a terminal receiver, a conduit for conveying said liquid from the reservoir to the terminal receiver, means for moving liquid through said conduit from the reservoir to the receiver, a return line for connection between the terminal receiver and reservoir, and automatic differential pressure regulator means in said return line for maintaining a back pressure within said terminal receiver exceeding the vapor pressure of said liquid.

5. In a system for dispensing a highly volatile liquid from a reservoir through a conduit to a terminal receiver, the combination of means in said conduit for maintaining the liquid flowing therein under a pressure exceeding the vapor pressure of said liquid and means having fluid communication with said first named means and with the vapor spaces above the liquid in the reservoir and the receiver, operative after the terminal receiver starts to fill with said liquid for maintaining a pressure of the liquid in the receiver and that flowing through said conduit exceeding said vapor pressure within the terminal receiver.

6. In a system for dispensing a highly volatile liquid from a reservoir to a receiver, the combination of a dispensing conduit for connecting between the reservoir and receiver, a pump in said conduit, a liquid meter in said conduit at the discharge side of said pump, a valve in said conduit at the discharge side of said meter, means responsive to the difference between pump pressure on the liquid and the vapor pressure of said liquid for controlling the operation of said valve and for providing a predetermined back pressure in the conduit upstream of said valve, a return line adapted to connect the receiver and reservoir vapor spaces above liquid levels, a second valve in said return line, and means responsive to the difference in pressure between said vapor spaces for controlling the degree of opening of said second valve for providing sufficient back pressure to enable said receiver to fill without appreciable vaporization of said dispensed liquid in the receiver.

7. In the system defined in claim 6, a venting conduit extending between said dispensing conduit at the inlet side of said meter and said return line between said second valve and the reservoir, and a restrictive orifice in said venting conduit permitting gas flow but essentially blocking liquid return to the reservoir therethrough.

8. In the system defined in claim 6, each of said pressure responsive means comprising a first chamber exposed to the pressure of the fluid valved thereby and a second chamber containing a spring of predetermined strength and normally connected to the vapor pressure space of said reservoir, and means for simultaneously closing both valves comprising means for admitting simultaneously liquid under pump pressure to said second chambers.

9. In the system defined in claim 8, a first-cross-conduit connection between said dispensing conduit at a point between the pump and meter and said return line between the second valve and the reservoir, a manual valve in said first cross-conduit, a restricted orifice in said first cross-conduit between the manual valve and the return line, a second cross-conduit interconnecting said second chambers, and another conduit connecting said second cross-conduit to said first cross-conduit at a point between the valve and orifice therein.

10. In a system for dispensing a highly volatile liquid from a reservoir to a receiver, a dispensing conduit for extending between the reservoir and receiver, said conduit containing in downstream succession a pump, a liquid meter and a valve, control means for said valve responsive to a differential between the pump outlet pressure and the vapor pressure of the liquid being dispensed, and valve means in fluid communication with the vapor space above the liquid in the receiver responsive to a differential between vapor pressures within the reservoir and receiver and effective when said receiver is being filled with said liquid for maintaining the pressure in said receiver above the vapor pressure of the dispensed liquid.

11. In the system defined in claim 10, bypass means for limiting pump outlet pressure.

12. In the system defined in claim 10, said last means comprising a return line between the vapor spaces of the receiver and reservoir, a normally closed valve in said return line, and control means in fluid communication with the vapor spaces above the liquid in the reservoir and the receiver for opening said normally closed valve only when the pressure in said receiver exceeds that of the reservoir by a predetermined amount above the vapor pressure of the dispensed liquid.

13. In a system for accurately dispensing highly volatile liquid from a reservoir to a receiver, a dispensing conduit for connecting from the reservoir to the receiver, said conduit containing in downstream succession a pump, a liquid meter and a first valve, control means for said first valve responsive to a differential between pump outlet pressure and the vapor pressure of the dispensed liquid, a return conduit for interconnecting the vapor spaces of said receiver and reservoir, a normally closed second valve in said return conduit, control means for said second valve responsive to the differential of vapor pressures in said receiver and reservoir, and a pump bypass conduit connecting between a point in said dispensing conduit located between the pump and the meter and said reservoir and containing a throttling valve for limiting the pump outlet pressure effective on said meter.

14. In a system for accurately dispensing highly volatile liquid from a reservoir to a receiver, a dispensing conduit for connecting between the reservoir and the receiver, said conduit containing in downstream succession a pump, a liquid meter and a valve having a differential pressure control device, means for applying the vapor pressure of the liquid in the reservoir and the outlet pump pressure to opposite sides of said differential pressure control device, a first return conduit for extending between the vapor spaces of said receiver and reservoir, a normally closed valve in said first return conduit having a pressure actuated control device responsive to the difference in pressure between said vapor spaces for opening said normally closed valve only when the pressure in said receiver exceeds the vapor pressure of the dispensed liquid by a predetermined amount, a second return conduit connecting a point in said dispensing conduit between the pump and meter to the vapor space of said reservoir independently of said first return conduit, and a venting conduit having a restricted orifice connected between said dispensing conduit at the upstream side of said meter and said second return conduit.

15. In the dispensing system defined in claim 14, a pump bypass conduit valved to limit the pump outlet pressure effective on said meter connected between said dispensing conduit and said second return conduit.

16. In a system for accurately dispensing highly volatile liquid from a reservoir to a receiver, a dispensing conduit for interconnecting the reservoir and receiver containing a pump and a liquid meter on the outlet side of the pump, control means in said conduit responsive to the difference between the pump outlet pressure and the vapor pressure of said liquid in the reservoir for maintaining said dispensed liquid against vaporization during flow from the reservoir and at least through said meter, and valve means in fluid flow control communication with the vapor space above the liquid in the receiver responsive to the difference in pressure between the vapor spaces in said receiver and reservoir effective only after liquid is being delivered into said receiver for preventing vaporization of the dispensed liquid passing between the reservoir and the receiver.

17. For use in combination with a reservoir and a receiver, a metered dispensing system for highly volatile liquid comprising: a dispensing fluid conduit means adapted to be connected in fluid communication with the liquid in the reservoir and to the interior of said receiver to convey liquid from the reservoir to the receiver including in successive downstream order, a pump, a liquid meter and a first differential pressure regulator valve with control means resiliently biased toward a valve closed position and urged toward valve open position by fluid pressure between said pump and said first valve; a vent line means adapted to be connected in fluid communication to the vapor space above the level of liquid in the receiver and including a second differential pressure regulator valve with control means resiliently biased toward a valve closed position and urged toward valve open position by fluid pressure in the vent line means between the vapor space above the receiver fluid level and said second valve; and fluid communication means adapted to be connected in fluid communication with the vapor space above the level of liquid in the reservoir and connected in parallel to the control means of said first and second valves whereby the vapor pressure in said reservoir can be applied to urge the control means of both valves toward a valve closed position.

18. The dispensing system as defined in claim 17 wherein said fluid communication means includes an orifice, and a valved means is in selectively controlled fluid communication from the conduit between said pump and said meter to said fluid communication means between said orifice and said valves.

References Cited in the file of this patent

UNITED STATES PATENTS

| | | |
|---|---|---|
| 2,012,362 | Thomas | Aug. 27, 1935 |
| 2,049,239 | Wilcox | July 28, 1936 |
| 2,126,367 | Clawson | Aug. 9, 1938 |
| 2,291,678 | Benz et al. | Aug. 4, 1942 |
| 2,329,323 | Benz | Sept. 14, 1943 |
| 2,368,215 | Hansen | Jan. 30, 1945 |
| 2,487,863 | Garretson | Nov. 15, 1949 |
| 2,725,722 | Ahlstrand | Dec. 6, 1955 |